US012800270B2

(12) United States Patent
Ooi et al.

(10) Patent No.: US 12,800,270 B2
(45) Date of Patent: Nov. 17, 2026

(54) FIREARM TRAINING SYSTEM

(71) Applicant: Radiosity Holdings, LLC, Houston, TX (US)

(72) Inventors: Han Shyone Ooi, Houston, TX (US); Abraham Elias Hamidi, Houston, TX (US)

(73) Assignee: RADIOSITY HOLDINGS, LLC, Houston, TX (US)

( * ) Notice: Subject to any disclaimer, the term of this patent is extended or adjusted under 35 U.S.C. 154(b) by 152 days.

(21) Appl. No.: 18/927,880

(22) Filed: Oct. 26, 2024

(65) Prior Publication Data

US 2025/0146792 A1 May 8, 2025

Related U.S. Application Data

(60) Provisional application No. 63/547,694, filed on Nov. 8, 2023.

(51) Int. Cl.
*F41G 3/26* (2006.01)
*G09B 19/00* (2006.01)

(52) U.S. Cl.
CPC ......... *F41G 3/2627* (2013.01); *F41G 3/2644* (2013.01); *G09B 19/00* (2013.01)

(58) Field of Classification Search
None
See application file for complete search history.

(56) References Cited

FOREIGN PATENT DOCUMENTS

WO WO-0037875 A1 * 6/2000 ............. F41G 3/165

* cited by examiner

*Primary Examiner* — James B Hull
(74) *Attorney, Agent, or Firm* — Bennet K. Langlotz; Langlotz Patent & Trademark Works, LLC

(57) ABSTRACT

A firearm training system has a screen configured to display target images, a plurality of location emitters associated with the screen, a firearm device, a camera mounted to the firearm device, the camera having a first imaging system operable to generate a first image with a first field of view, the camera having a second imaging system operable to generate a second image with a second field of view greater than the first field of view, an image processor connected to the first and second imaging systems, the image processor operable to calculate a firearm device location relative to the screen based on the first image unless at least one of the location emitters is outside the first field of view, in which case the second image is used for the firearm device location calculation.

9 Claims, 5 Drawing Sheets

FIREARM TRAINING SYSTEM

CROSS-REFERENCE TO RELATED APPLICATION

This application claims the benefit of U.S. Provisional Patent Application No. 63/547,694 filed on Nov. 8, 2023, entitled "FOVEATED INSIDE OUT TRACKING SYSTEM FOR DIRECT AND INDIRECT FIRE WEAPON TRAINING," which is hereby incorporated by reference in its entirety for all that is taught and disclosed therein.

FIELD OF THE INVENTION

The present invention relates to firearms, and more particularly to a firearm training system that enables both direct and indirect fire weapon training.

BACKGROUND AND SUMMARY OF THE INVENTION

Current military training simulator systems built around laser detection on a projection screen are incapable of allowing soldiers to perform indirect fire training. Laser modules are attached to direct fire weapons, and optical detectors are used to determine where a fired laser hits. The problem with this approach is it provides inaccurate training outside of short ranges because lasers travel in a straight line while the bullet rounds the lasers simulate travel in arches. Lasers also cannot be used to train indirect fire weapons because of the steeply arching ballistics associated with those weapons.

Other methodologies that attempt to combine Global Positioning System, Inertial Measurement Units, and fiducial markers are also too inaccurate beyond short range because of the high error of their sensors. These errors are magnified with distance, which leads to inaccurate training. Meanwhile, Open Virtual Reality trackers do not operate well under recoil or in outdoor lighting conditions.

Therefore, a need exists for a new and improved firearm training system that enables both direct and indirect fire weapon training. In this regard, the various embodiments of the present invention substantially fulfill at least some of these needs. In this respect, the firearm training system according to the present invention substantially departs from the conventional concepts and designs of the prior art, and in doing so provides an apparatus primarily developed for the purpose of enabling both direct and indirect fire weapon training.

The present invention provides an improved firearm training system, and overcomes the above-mentioned disadvantages and drawbacks of the prior art. As such, the general purpose of the present invention, which will be described subsequently in greater detail, is to provide an improved firearm training system that has all the advantages of the prior art mentioned above.

To attain this, the preferred embodiment of the present invention essentially comprises a screen configured to display target images, a plurality of location emitters associated with the screen, a firearm device, a camera mounted to the firearm device, the camera having a first imaging system operable to generate a first image with a first field of view, the camera having a second imaging system operable to generate a second image with a second field of view greater than the first field of view, an image processor connected to the first and second imaging systems, the image processor operable based on the first image when the location emitters are within the first field of view to calculate a firearm device location relative to the screen, and the image processor operable based on the second image when at least one of the location emitters is outside the first field of view to calculate a firearm device location relative to the screen. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
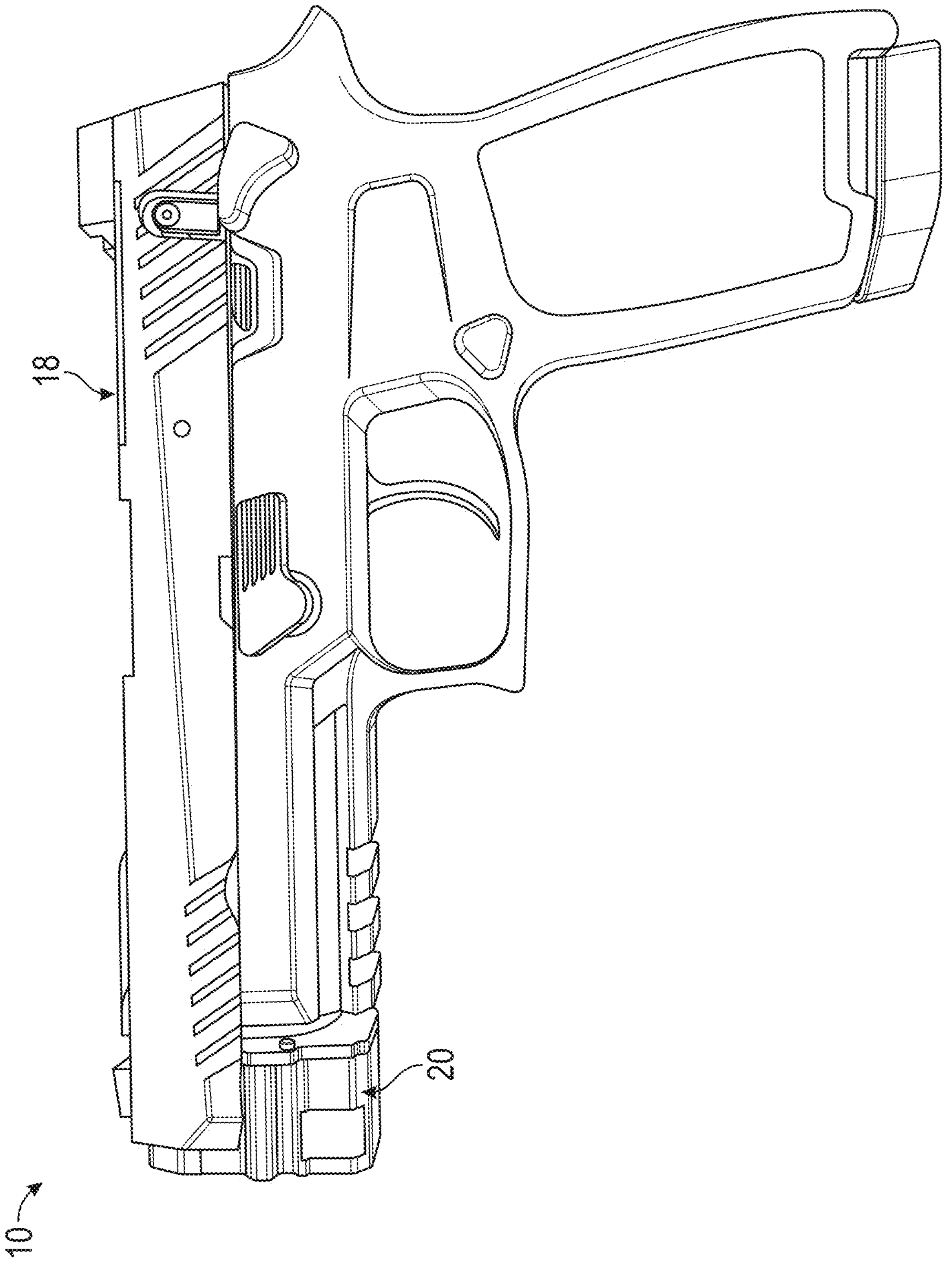
FIG. 1 is a left side view of the current embodiment of a firearm training system constructed in accordance with the principles of the present invention.
Figure 2:
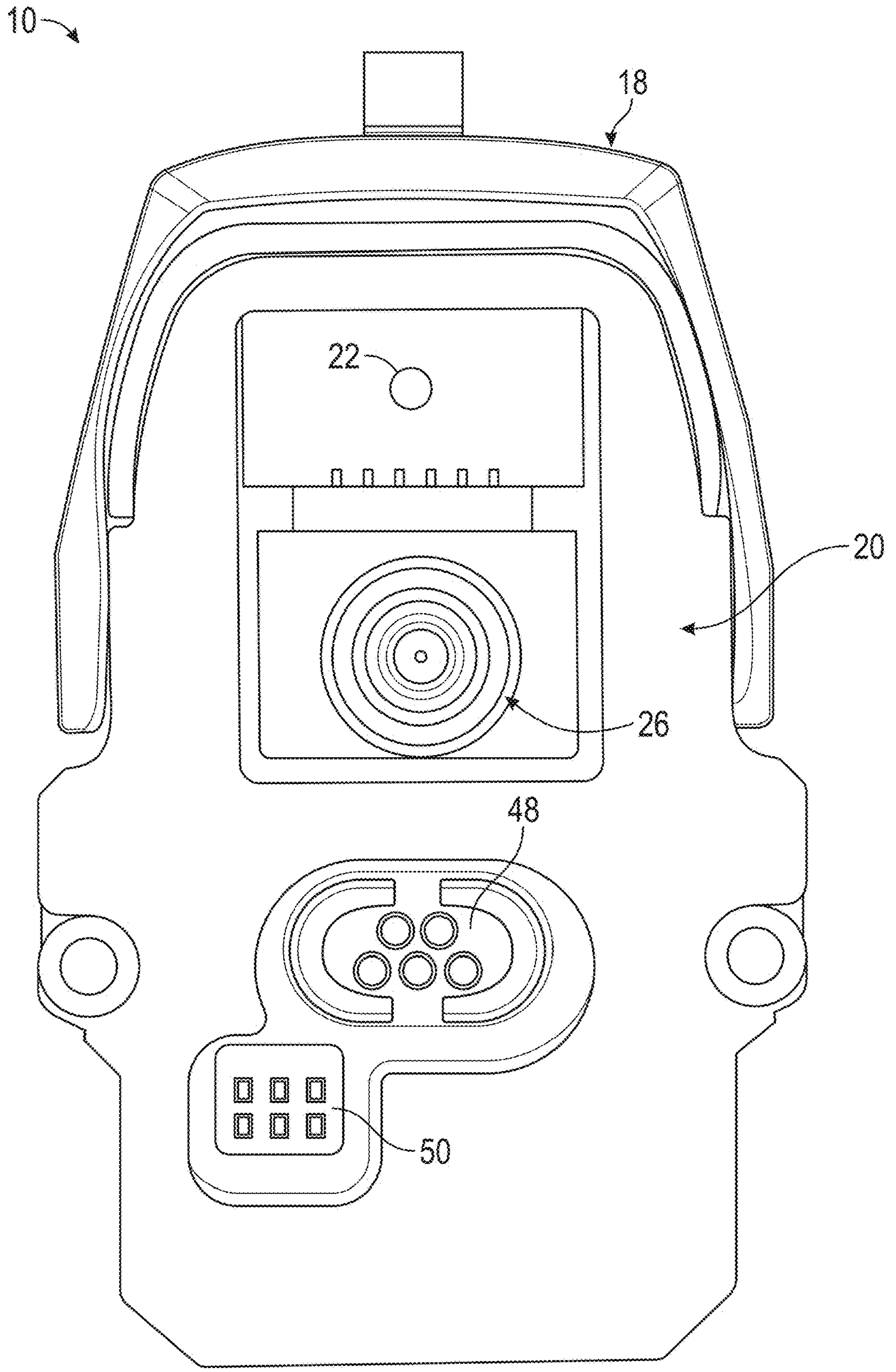
FIG. 2 is a front view of the firearm training system of FIG. 1.
Figure 3:
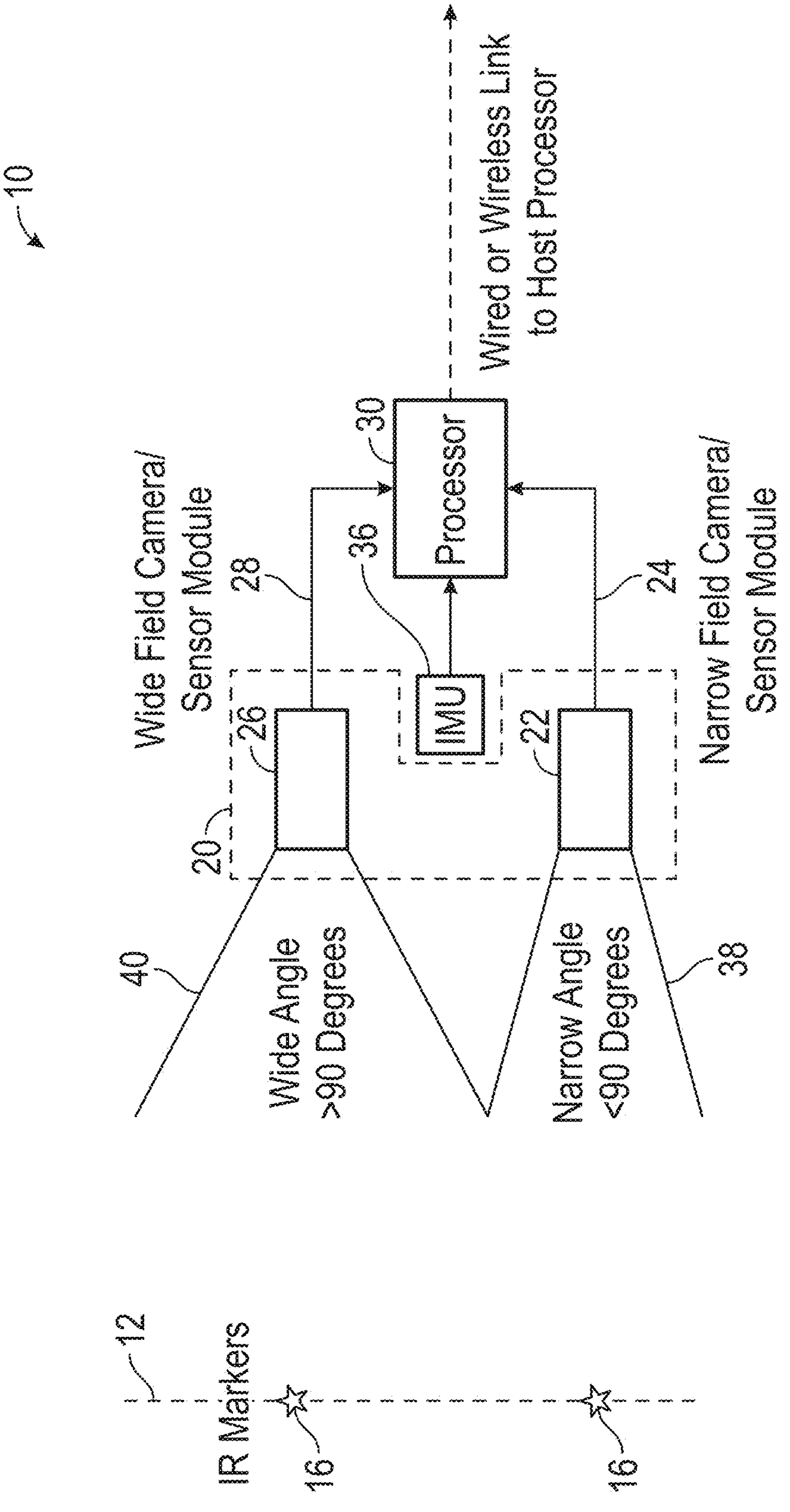
FIG. 3 is a schematic view of the firearm training system of FIG. 1.
Figure 4:
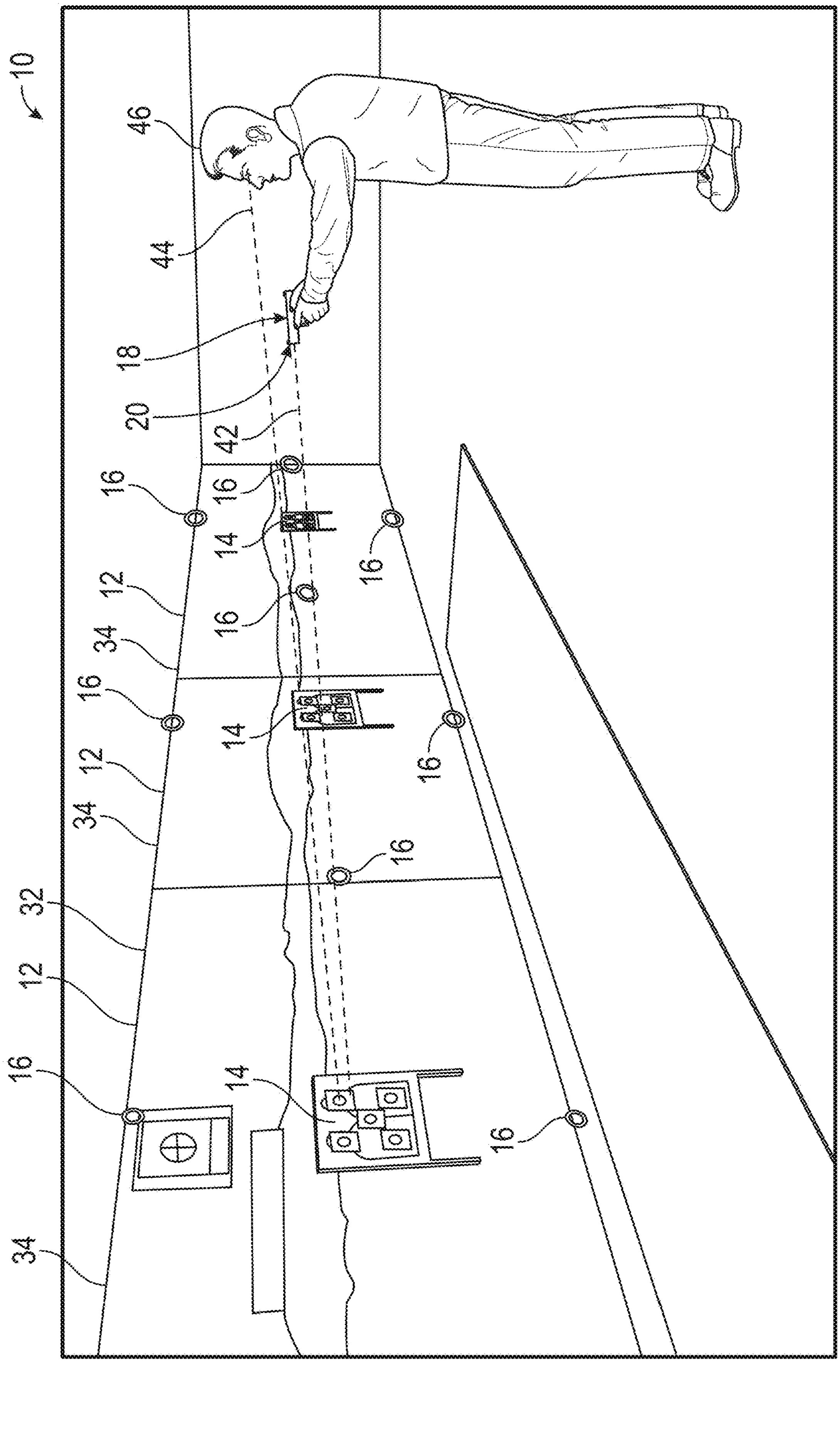
FIG. 4 is a rear perspective view of the firearm training system of FIG. 1 in use tracking a user's direct fire aim.

An embodiment of the firearm training system of the present invention is shown and generally designated by the reference numeral 10.

FIGS. 1-4 illustrate the improved firearm training system 10 of the present invention. More particularly, the firearm training system has one or more screens 12 configured to display target images 14, a plurality of location emitters 16 associated with the screen, a firearm device 18, and a camera 20 mounted to the firearm device. The camera has a first imaging system 22 operable to generate a first image 24 with a first field of view 38. The camera also has a second imaging system 26 operable to generate a second image 28 with a second field of view 40 greater than the first field of view. An image processor 30 is connected to the first and second imaging systems. The image processor is operable based on the first image when the location emitters are within the first field of view to calculate a firearm device location relative to the screen. The image processor is operable based on the second image when at least one of the location emitters is outside the first field of view to calculate a firearm device location relative to the screen. Ports 48, 50 on the camera can be used for providing power to the camera and data communications between the camera and the image processor or between the image processor and additional electronics that produce the target images.

In the current embodiment, the location emitters 16 are infrared emitters located at the periphery 32 of the screen 12. The location emitters may have a large dome to enable the location emitter to be imaged at a sharp angle. The screen preferably includes a plurality of adjacent screen displays 34. The first imaging system 22 has a field of view of at least 30 degrees and less than 90 degrees. The second imaging system 26 has a field of view of at least 90 degrees and less than 150 degrees. The second field of view is at least 1.5 times the first field of view.

Figure 5:
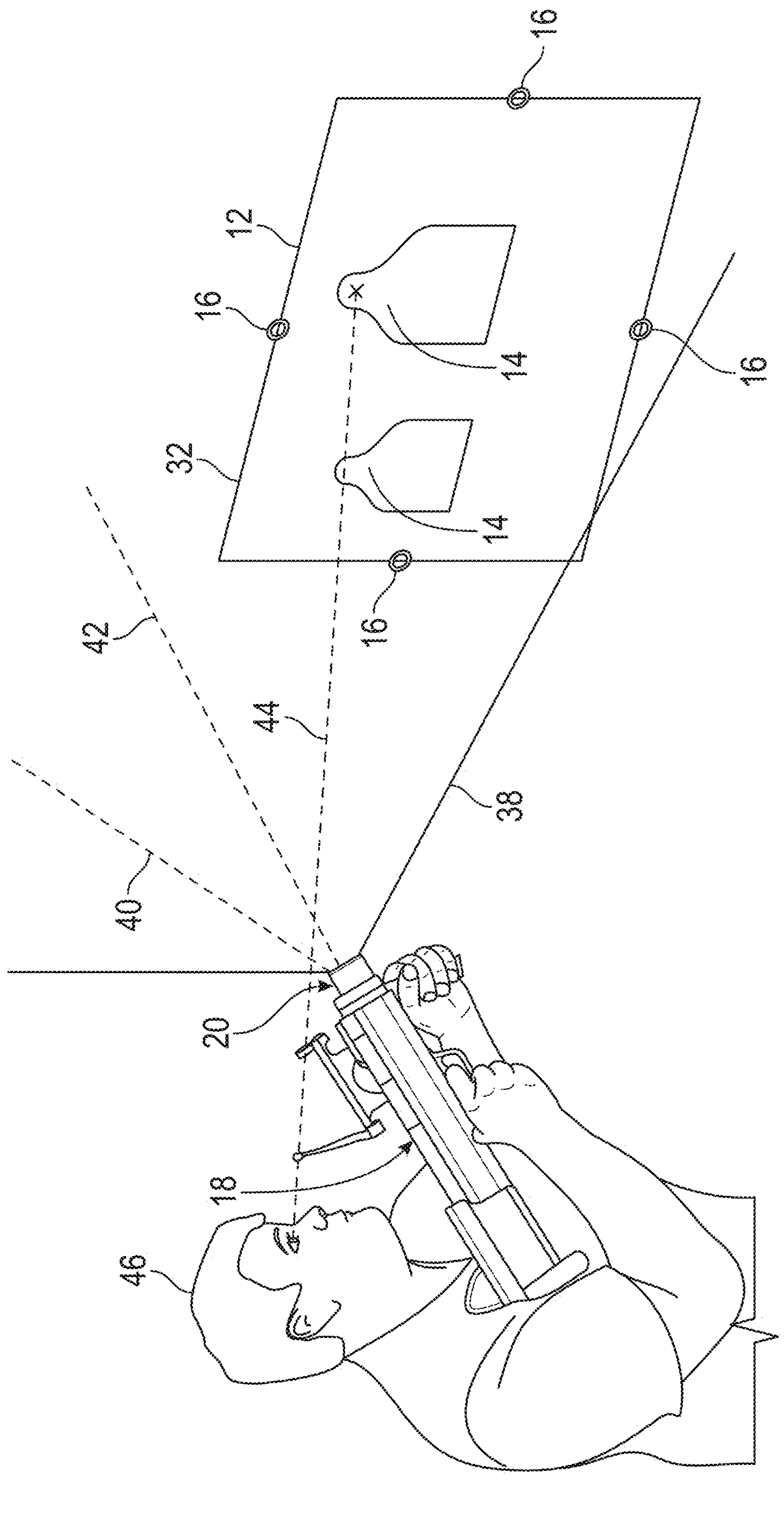
FIG. 5 is a right side view of the firearm training system of FIG. 1 in use tracking a user's indirect fire aim.

The current invention enables indirect fire training because the firearm training system 10 is a weapon-mounted dual vision sensor system using one narrow field and one wide field vision sensor (first and second imaging systems 22, 26). The narrow field sensor enables the firearm device 18 to track aim precisely for direct fire (shown in FIG. 4, where the firearm device 18 is pointed along axis 42 at the screen 12 substantially aligned with the line of sight 44 of the shooter 46). In contrast, the wide field sensor enables indirect fire aim above the screen 12 (shown in FIG. 5, where firearm device 18 is pointed along axis 42, which is above both the screen and the line of sight 44 of the shooter 46). The narrow and wide field sensors track the position of the location emitters 16 placed around a projection screen or large screen TV to enable realistic direct and indirect fire weapon training and gaming. The location emitters are used to set the boundaries of the screen and are visible to the dual vision sensor system. The narrow field sensor may have a high level of magnification and a narrow lens for tracking the location emitters more accurately. The wide field sensor may have a larger lens to enable a high angle tracking mode of the location emitters. Although not capable of the same high accuracy of impact tracking as the narrow field sensor, the wide sensor provides adequate accuracy of impact tracking for indirect fire weapons. Conventional laser-based firearm simulators are incapable of impact tracking for indirect fire weapons.

The firearm training system 10 is a direct and indirect fire weapon training system that includes firearm devices 18 (which can include handguns, rifles, shotguns, machine guns, grenade launchers, mortars) and electronic components including two or more camera or vision sensors (camera 20 with first and second imaging systems 22, 26), an Inertial Measurement Unit (IMU) 36, a 3D positional sensor (which can be an ultra-wide band, Bluetooth 5.1 direction finding, Open Virtual Reality tracker puck), an image processor 30, and location emitters 16. The electronic components can be attached to or built into firearm devices to determine the positional origination of a fire event and the precise point of impact of the projectile fired by the firearm device along with inclination and cant data needed for simulation software to calculate true ballistics of the projectile on the simulation platform (which can include VBS4, Unity, Unreal Engine).

The two or more cameras or vision modules (camera 20 with first and second imaging systems 22, 26) have different field of views. The wide field camera/vision sensor enables high angle tracking of the location emitters 16 for indirect fire weapons' point of impact determination (grenade launchers, mortars). The higher magnification, narrower field of view of the second (or more) sensor enables higher precision tracking of the location emitters for precise aim of direct fire weapons (handguns, rifles, shotguns, machine guns).

The human eye sees images in high resolution in the center of the eye's field of view while concurrently viewing images at lower resolution in the periphery. The term to describe this is foveated vision. The camera 20 with first and second imaging systems 22, 26 mimics the human eye's capabilities by using both a narrow angle vision sensor and a wide field vision sensor to simulate the foveated vision of the human eye with a high resolution in the center of field and lower resolution in the periphery. The foveated sensing system of the firearm training system 10 enables the user to train with combination direct and indirect fire weapons, such as the US Army M4 rifle equipped with M320 grenade launcher. The firearm training system enables tracking and training on live outdoor ranges, indoor live ranges, projection screens, VR reality goggles (such as Oculus Quest, Pico Neo), and XR headsets (such as IVAS, Hololens, Magic Leap, Meta Pro).

In a preferred embodiment, the camera 20 has first and second imaging systems 22, 26 with different field of views. The first imaging system has a field of view of less than 90 degrees, and the second imaging system has a field of view of more than 90 degrees. The first and second imaging systems run concurrently to track two or more location emitters 16. The camera feeds first and second images 24, 28 to a controller/processor chip 30. There is also an Inertial Measurement Unit (IMU) 36 connected to the controller/processor chip to determine the first and second imaging systems' orientation and gravity vector. The first and second imaging systems operate together to detect the location emitters. Data from the wide field second imaging sensor can be used with the data from the narrow field first imaging sensor to provide high accuracy and high angle tracking capabilities through interpolation between the two data sets. The wide field of tracking along with the Inertial Measurement Unit measuring cant and tilt enables the firearm device 18 to aim above the top of the simulator screen 12 and still accurately arch shots into the screen.

In an alternative embodiment, the first and second imaging systems 22, 26 are replaced with two infrared object tracking sensors to detect the positions of the location emitters 16. One of the infrared object tracking sensors detect a wider field than the second, which detects a narrower field. The narrow field infrared sensor provides greater precision for direct fire tracking, while the wider field sensor allows higher angle aiming useful for indirect fire. Interpolation algorithms look at the ratio of the location emitters on the wider field relative to the narrow field to provide precision tracking even when the narrow field sensors do not see all the location emitters. An Intertial Measurement Unit is used to determine orientation, cant, and tilt of the infrared object tracking sensors.

Both embodiments of the firearm training system feed data through either a wired (USB, SPI, I2C) connection or wireless connection (BLE, WiFi, Zigbee, Enhanced Shockburst) connection to a computer, tablet, smartphone or AR/VR/XR headset to analyze and record shot data or render weapon shooting in a game or simulation. The two embodiments can also be paired with location base tracking technology, such as BLE direction finding, ultra-wideband, GPS to determine physical location and height of the shot to accurately model the trajectory of indirect and direct fire rounds in games and simulators.

While a current embodiment of a firearm training system has been described in detail, it should be apparent that modifications and variations thereto are possible, all of which fall within the true spirit and scope of the invention. For example, the firearm training system can be mounted on the accessory rail of firearms. This version is a 1-inch outer diameter tube that fits into 1-inch weaver or picatinny rings to mount to any kind of weapon. This version is considered to be especially attractive for civilian use. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A firearm training system comprising:

a screen configured to display target images;

a plurality of location emitters associated with the screen;

a firearm device;

a camera mounted to the firearm device;

the camera having a first imaging system operable to generate a first image with a first field of view;

the camera having a second imaging system operable to generate a second image with a second field of view greater than the first field of view;

an image processor connected to the first and second imaging systems;

the image processor operable based on the first image when the location emitters are within the first field of view to calculate a firearm device location relative to the screen; and the image processor operable based on the second image when at least one of the location emitters is outside the first field of view to calculate a firearm device location relative to the screen.

2. The firearm training system of claim 1 wherein the location emitters are infrared emitters.

3. The firearm training system of claim 1 wherein the location emitters are located at the periphery of the screen.

4. The firearm training system of claim 1 wherein the screen includes a plurality of adjacent screen displays.

5. The firearm training system of claim 1 wherein the first imaging system has a field of view of less than 90 degrees.

6. The firearm training system of claim 1 wherein the first imaging system has a field of view of greater than 30 degrees.

7. The firearm training system of claim 1 wherein the second imaging system has a field of view of greater than 90 degrees.

8. The firearm training system of claim 1 wherein the second imaging system has a field of view of less than 150 degrees.

9. The firearm training system of claim 1 wherein the second field of view is at least 1.5 times the first field of view.

* * * * *